United States Patent Office 3,809,594
Patented May 7, 1974

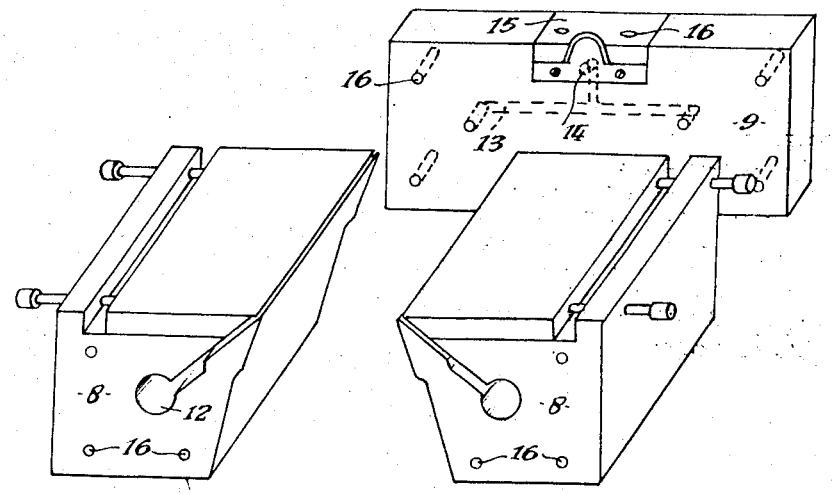
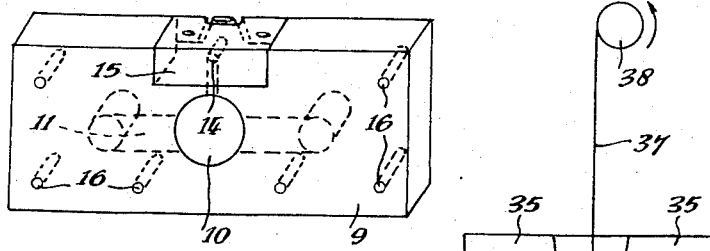
Fig. 2.
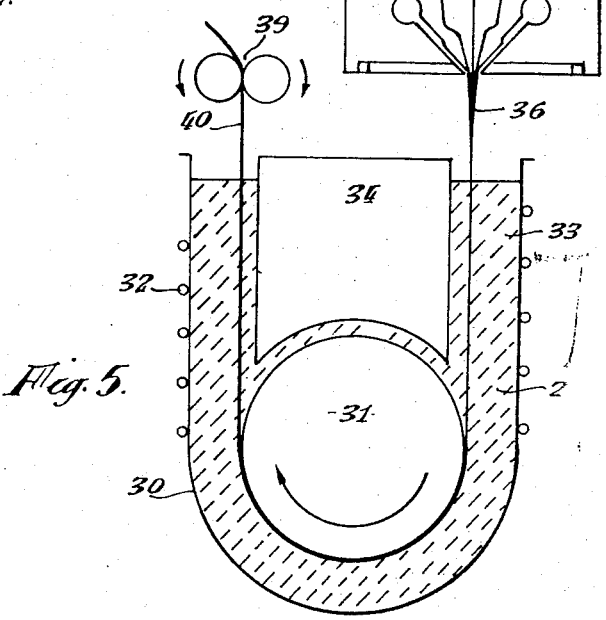
Fig. 5.

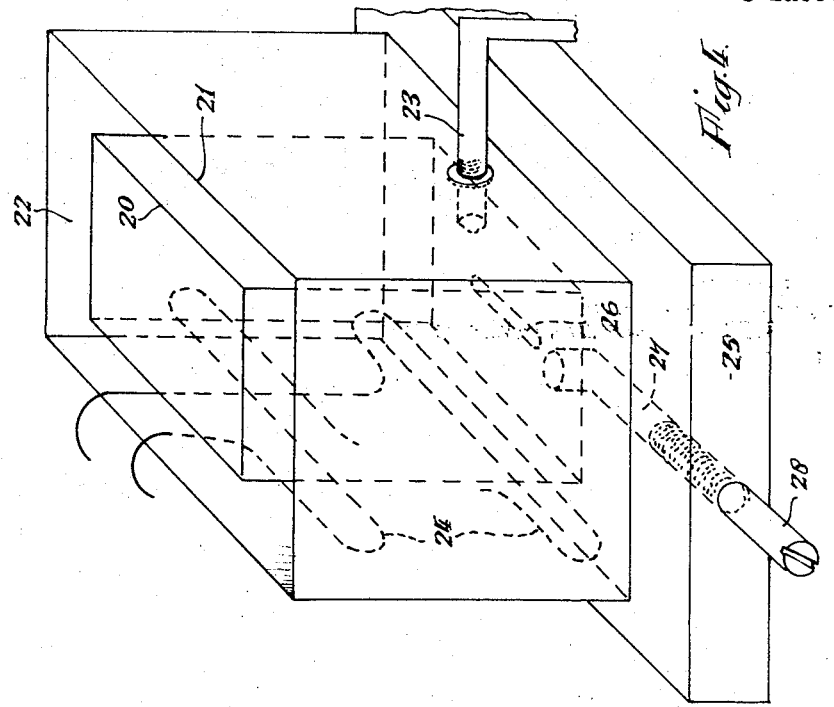
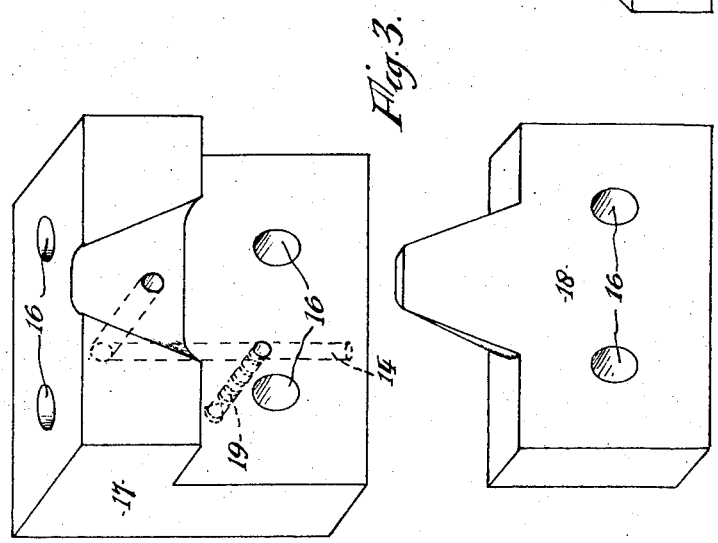

3,809,594
MANUFACTURE OF COMPOSITE PLASTICS
STRUCTURES
Terence John Taylor-Brown, Ipswich, and James Jack, Manningtree, England, assignors to Bakelite Xylonite Limited, London, England
Filed Oct. 8, 1971, Ser. No. 187,692
Claims priority, application Great Britain, Oct. 9, 1970, 48,141/70
Int. Cl. B29b 27/00
U.S. Cl. 156—244
34 Claims

ABSTRACT OF THE DISCLOSURE

Manufacture of composite plastics structure in which an unbonded structure comprising a reinforcing layer and at least one thermoplastic layer is passed through a treatment unit in which it is subjected to heat and liquid pressure to bond the structure.

---

This invention relates to a process and apparatus for the continuous manufacture of a composite plastics structure and especially to a process and apparatus for the continuous manufacture of a web comprising a reinforced plastics laminate.

It is known to produce laminates by placing a fibrous and/or filamentous material between sheets of thermoplastic polymeric material and placing the thus-formed assembly between the platens of a press and subjecting it to the action of heat and pressure. This method has the disadvantage that the high pressures required to produce a satisfactory laminate can result in the fibrous or filamentous material being crushed and fractured which is detrimental to the attainment of optimum properties in the final product. This method also has the disadvantage that the high temperatures which have to be employed must be maintained for considerable periods which can result in degradation of the thermoplastic polymeric material which is again detrimental to the attainment of optimum properties in the final product. In addition, this method suffers from the disadvantage that the thermoplastic tends to exude from the sides of the assembly during pressing with resulting loss of material, loss of gauge accuracy, and imperfect impregnation.

It is also known to employ nip rolls in the form of calenders to apply the necessary pressure to cause impregnation lamination of thermoplastics and fibrous or filamentous reinforcing materials. Such nip rolls provide only limited dwell-time and usually have to be maintained at relatively low temperatures to avoid sticking of the thermoplastic to the rolls, thus necessitating high pressures which can cause damage to the fibrous or filamentous material.

It has also been proposed to use a hot-air blast to provide the pressure and heat necessary to laminate an extruded thermoplastic web on to a base sheet. In addition, the use of vacuum and gas pressure have been proposed to assist lamination of sheet materials. Further, heated liquids have been proposed to act as heat transfer media in the heat-sealing of contacting surfaces of thermoplastics films as in the heat-seal closing of bags.

This invention provides a process for the continuous production of laminates incorporating reinforcing materials especially fibrous and/or filamentous reinforcing materials, which overcomes or reduces the disadvantages previously mentioned in connection with known processes.

The invention also provides apparatus for use in the process of the invention.

The process of the invention for the continuous manufacture of a composite plastics structure comprises progressively passing an unbonded laminar structure comprising a reinforcing layer and at least one layer of thermoplastics material arranged so that liquid cannot contact the interface between the layers into a body of liquid wherein it is subjected to a temperature such that the thermoplastic layer is at least softened, and a pressure that causes the layers to be urged towards one another so as to bond the layers together to form a composite plastics structure and progressively withdrawing said composite plastics structure from the body of liquid.

The unbonded laminar structure may comprise a single thermoplastic layer or it may comprise two or more thermoplastic layers on one or both sides of the reinforcing layer.

The unbonded laminar structure is arranged so that liquid cannot contact the interface between the layers. This may be achieved by clipping or sealing together the edges of the laminar structure at points along its length or by providing a continuous clamp or seal along the edge of the structure. Preferably, however, the unbonded structure comprises a flattened tubular thermoplastic web inside which is the reinforcing layer.

Where two or more layers of thermoplastics material are included in the laminar structure they may comprise the same or different thermoplastics materials or may each comprise a combination of different thermoplastics. Any thermoplastic may be employed which can be formed, either alone or in combination with another thermoplastics, into a thermoplastics web and which will not be undesirably affected either physically or chemically by the liquid treatment employed in the process of the invention but should be such that the liquid treatment will cause portions of the material to be bonded to one another and/or to the reinforcing material to form a composite plastics structure. Examples of thermoplastics which may be employed in the process of the present invention are polyethylene, polypropylene, plasticized and unplasticized polyvinyl chloride, polymethyl methacrylate, nylon, polyethylene terephthalate and styrene-acrylonitrile copolymers.

The reinforcing material may comprise any material which will not be affected undesirably by the process of the invention in the manufacture of the desired composite plastics structure. It may, for example, comprise a continuous or non-continuous web of plain, embossed or molded material, a continuous or non-continuous filament or tow, a fibrous and/or filamentous woven or nonwoven web or netting. The reinforcing material may be, for example, a thermoset resin or a thermoplastic resin, carbon, metal, glass, or a mineral such as fibrous asbestos. When the reinforcing material is enveloped in a flattened tubular thermoplastic web or is sandwiched between two thermoplastics layers it may be formed prior to or at the same time as it becomes enveloped by the flattened tubular thermoplastics web or sandwiched between the two layers. For example, when the reinforcing material is a thermoplastics web this may be extruded as an interlayer at the same time as the extrusion of the flattened tubular thermoplastics web or the thermoplastics layer.

If desired two or more layers of reinforcing material may be incorporated in the structure and in such cases it is possible for an additional layer of thermoplastic material to be interposed between the reinforcing layers. Two layers of reinforcing material may be incorporated by using a folded single layer in which case, when the composite structure comprises the reinforcing layer totally enveloped by the thermoplastic layer, the composite structure may be slit along one edge and opened out to form a flat sheet of double width comprising the reinforcing layer to one side of which is bonded the thermoplastic layer. It is also possible where two reinforcing layers are totally enveloped in a thermoplastics material to slit the composite structure along both edges to produce two sheets of reinforcing material having an adherent layer of thermoplastic material on one side only. When a composite structure including two reinforcing layers is to be slit along one or both edges it is desirable that a barrier layer be inserted between the reinforcing layers of the unbonded structure to avoid the possibility of the thermoplastic material on both sides of the reinforcing material from bonding together through the reinforcing material.

Direct extrusion of a flattened tubular thermoplastics web may be conducted employing any convenient extrusion apparatus which may be remote from the treatment unit or directly associated with and in contact with the treatment unit. Preferably, the apparatus has the facility for introducing the reinforcing material, preferably continuously, into the flattened tubular web.

The liquid employed in the process of the invention for liquid treatment of the unbonded laminar structure may be any liquid which will provide the temperature and pressure required for adequately treating the thermoplastics layer and should be such as to have no undesirable effect on the thermoplastics materials during treatment. It is preferable that the liquid is such that it is easily removed from the web after treatment and for this purpose is preferably relatively inert towards the thermoplastics material. The liquid may be, for example an oil, for example, a silicone or hydrocarbon oil, a metal in the liquid state, or wax in the liquid state. Metals are especially preferred because of their high thermal conductivities, high specific gravities and relative inertness towards plastics. The high specific gravity of metals facilitates the use of open treatment units of small depth to attain the desired pressure for treatment of the thermoplastics material. If small depth treatment units are employed with low specific gravity liquids, the pressure in the body of liquid can be raised, for example, by applying gas pressure to the surface but this necessitates the use of pressure seals apart from additional pressurizing equipment.

The high specific gravity of metals, for example, can also provide buoyancy to the structure during its passage through the liquid. This can be of some advantage when extruding the structure into the bottom of a treatment unit comprising a molten metal bath since the buoyancy acts to assist the passage of the thermoplastics material in a low-strength, soft state, vertically through the liquid. To reduce oxidation of the surface of liquid metals, a barrier layer of a high-boiling liquid such as glycerol or dioctyl phthalate may be floated on the surface. Such barrier liquids should, of course, also have no undesirable effect on the plastics material with which they may come into contact. The use of a barrier liquid on the surface of a molten metal at least in the region where the composite plastics structure is withdrawn from the metal can enhance the release of the metal from the surfaces of the plastics material as the composite plastics structure is withdrawn.

The liquid employed in the treatment unit will normally be heated and will act as a heat transfer medium to raise the temperature of the thermoplastic material to the desired level for bonding to take place during treatment. However, the thermoplastic material may be at a suitable temperatures before entering the treatment unit and the liquid may in this case act as a heat transfer medium to maintain the temperature of the thermoplastic material at the desired level for bonding, or to conduct heat away from the material during its passage through the treatment unit.

The invention also includes apparatus for carrying out the process, which comprises means for supplying an unbonded laminar structure comprising a reinforcing layer and at least one thermoplastics layer in continuous manner, a treatment unit containing a body of liquid for effecting liquid treatment of the unbonded laminar structure and means for passing the unbonded structure into the body of liquid and for withdrawing the composite plastics structure therefrom.

The means for supplying the unbonded laminar structures may simply comprise supply means for the material of each thermoplastic layer, for example supply reels or an extrusion die, and for the material of the reinforcing layer and means for assembling the unbonded structure so that liquid cannot contact the interface between the layers. When the structure includes two or more layers of thermoplastic material the supply means may include means for producing a continuous or intermittent edge seal between the thermoplastics layers. When the thermoplastics material is in the form of a flattened tubular web, the supply means may comprise, for example, a reel of lay-flat tubing or means for producing lay-flat tubing. Preferably, however, the supply means comprises an extrusion die adapted for the direct extrusion of the flattened tubular thermoplastics web. Such an extrusion die can be of any convenient form but it is preferably of the cross-head type such that the reinforcing material can be fed through the die from an external source and interposed between the two opposing sides of the flattened tubular thermoplastics web during formation of the latter. One form of die which is suitable for use in such a process comprises two end-fed sheet dies arranged such that during or after the extrusion of thermoplastics webs therefrom, the edge portions of said webs are joined by allowing them to come together, or by bringing them together, while the webs are still in the hot condition or are joined by introducing bridging sections extruded at the same time as the thermoplastics webs and extruded from additional die end sections of an overall composite die to thus effect the direct extrusion of a flattened tubular thermoplastics web.

It will be appreciated that the nature of the supply means will be dictated, to a large extent, by the nature of the desired composite plastics structure. If it is desired, for example, that the flattened tubular thermoplastic web be comprised of different or differently colored thermoplastics, for example, a suitably ducted composite extrusion die may be employed as supply means, the ducts being connected to different sources of thermoplastics, conveniently provided by conventional extruders. Where a suitably fed cross-head type die is employed as means to supply the flattened tubular thermoplastics web by direct extrusion, the design of the die will to some extent be dictated by the mode of operation of the process of the invention, the dimensions of the flattened tubular web to be be extruded, the desired degree of thickness control of the extrudate and economics of die manufacture.

The treatment unit may comprise any container for a liquid through which the unbonded laminar structure can be passed and may be provided with heating and/or cooling means for the liquid. The treatment unit may be pressurized with gas above the surface of the liquid but generally, when the liquid has a high specific gravity, no pressurizing is necessary since the hydrostatic pressure of such a liquid at reasonable depth normally provides sufficient pressure to operate the process. When pressurizing is necessary, the treatment unit will normally be provided with flexible seals at the point or points where the unbonded structure enters and the composite plastics structure is withdrawn from the unit. The treatment unit may be so constructed that the unbonded structure may enter, and the composite structure leave, the unit at the top, side or bottom.

As has been mentioned hereinbefore, the liquid employed in the treatment is preferably a metal in the liquid state. Suitable metals which may be employed include mercury and alloys based on tin and/or lead which may contain, for example, bismuth, cadmium, copper, silver, thallium, zinc, indium, antimony or gallium. Such alloys can be formulated to have a range of melting points of from 17° C. to at least 227° C., which enables an adequate range of treatment temperatures to be attained in the treatment unit.

The means for passing the unbonded structure into and withdrawing the composite plastics structure from the treatment unit may comprise one or more devices which push the unbonded structure or pull the composite structure or which convey the material through the treatment unit. Where the path of the structure through the treatment unit is linear, a pair of nipped rollers may be all that is required to draw the structure through the treatment unit. If the path is non-linear, one pair of nipped rollers employed in conjunction with one or more idler rollers for changing the direction of the structure may be all that is necessary. It is sometimes desirable to alter the surface of the composite plastics structure leaving the treatment unit and in such cases the nipped rollers can serve to effect this alteration as well as draw the tubular web through the treatment unit. If it is required, for example, that a composite plastics structure comprising a glass-fibre reinforced thermoplastics laminate being produced by the process of this invention be given a smooth surface, it is possible to employ polished nipped rollers at a suitable temperature both to draw the composite structure away from the treatment unit and to impart the desired finish to the surface of the structure. It will of course, be appreciated that separate finishing rollers or other devices may be employed to modify the composite plastics structure during or after its formation in the process of this invention.

Preferably, the arrangement is such that the unbonded structure enters the liquid from the top of the unit and passes round a roller immersed in the liquid and is withdrawn again from the top of the unit. In such a case the roller in the treatment unit may idle or be driven. Advantageously a release coating is applied to the roller. This may be a permanent coating such as a polytetrafluoroethylene coating or a temporary coating of a material such as glycerol or glycerol tristearate. A temporary coating of release agent may be applied by running the roller through a reservoir of the release agent. Preferably, there is provided a continuous conveyor band which passes round the roller and follows at least a part of the path of the structure into and out of the unit since this assists the passage of the structure round the roller and helps to avoid adhesion of thermoplastic material to the roller. At or after the point where the band composite structure leave the treatment liquid a cooling roller may be provided to chill the thermoplastic and assist in stripping. If desired, the band may have a contoured surface to impart a textured surface to the composite structure. A release agent, for example glycerol or glycerol tristearate, may be applied to the band before it contacts the unbonded structure. Alternatively the band may have a permanent coating of a release agent such as polytetrafluorethylene. When the roller in the treatment bath is a driven roller it may be used to drive the band.

In operating the process of the present invention, the unbonded structure, continuously fed from a suitable source is passed through the body of liquid in the treatment unit. The feed to the treatment unit may be in any direction, but is preferably in the downward direction which facilitates direct passage from an extruder into the treatment unit. The nature of the reinforcing layer may, however, dictate the direction of travel of the feed. In whichever direction the feed takes place the unbonded structure need not necessarily be passed directly into the treatment unit, although this is preferable in the case of direct extrusion of the thermoplastic layer since it is normally desirable to conserve, as far as possible, the heat of the extrusion and make use of it in the bonding process which takes place in the treatment unit. The unbonded structure is therefore progressively passed, directly or indirectly, into the body of liquid in the treatment unit to a depth and pressure such that the lower pressure between the layers of the structure at the temperature of treatment causes opposing portions of the structure to be urged towards one another and to bond them to one another. It will be appreciated that at the start-up of the process of the present invention it is necessary to take measures to prevent the treatment liquid from entering the end of the structure, also to avoid loss of the liquid through regions of the treatment unit which, during continuous running may be sealed by the entery of the unbonded structure or the exit of the composite structure.

To reduce the risk of air, or other gas, or vapor being undesirably trapped between the layers of the unbonded structure and consequently in the final composite plastics structures, or to assist impregnation of a permeable reinforcing material it may be desirable to reduce the pressure within the unbonded structure before it is passed into the treatment unit and this may be done by any suitable means. When a flattened tubular thermoplastics web is produced by direct extrusion, a vacuum supply may be connected to a conduit leading to the inside of the extrusion die, or the whole die and substrate supply may be enclosed within a chamber under reduced pressure.

It will be appreciated that the liquid in the treatment unit is maintained at a temperature such that effective bonding of portions of the thermoplastics material to the reinforcing material and/or to another layer of thermoplastics material occurs during passage through the treatment unit. Clearly, the treatment unit may contain heating and/or cooling regions which may heat and/or cool the thermoplastics material during its passage therethrough for example to set a bond. It will also be appreciated that in some cases it may be necessary to preheat or cool the thermoplastic material or the reinforcing material before it enters the treatment unit and this can be effected by any convenient means.

The progressive passage of the unbonded structure into the treatment unit is important in that an ironing action takes place which assists the formation of a uniform product, the action being to reduce the random formation of wrinkles and bubbles.

The composite plastics structure may be withdrawn from the treatment unit by employing, for example, a pair of driven lightly nipped rollers, which need not necessarily grip the structure across its entire width. The composite plastics structure during or after passage from the treatment unit may be subjected to a further treatment to stabilize the bond and/or to modify a surface before being batched and stored.

In the case of direct extrusion of the thermoplastic layer the process of the invention is advantageous in that it enables the production of laminates from different materials employing at least some of the heat of extrusion in the lamination stage of the process but without the necessity of a very complex die. In addition, the substantial exclusion of the atmosphere between extrusion and lamination may facilitate the preparation of strong laminates which in certain cases would otherwise be difficult to produce. The process may also facilitate the continuous adhesive lamination of extrudates.

The process may be applied to the continuous production of a long-fibre glass reinforced thermoplastics injection-moulding compound, it being possible, for example, to feed rovings continuously through a cross-head die, and, after lamination to chop the product to the desired size. Fibre reinforced thermoplastics webs are with advantage manufactured by the process of the invention. It has been found that composite plastics structures comprising glass-fibre mat bonded between thermoplastics layers and made according to the process of the invention may have a density closely approaching the theoretical value, indicating that impregnation of the glass mat by the thermoplastic can be achieved efficiently with the substantial exclusion of internal voids. It is not however always desirable to exclude all internal voids in the composite plastics structure produced by the process of the invention and the temperatures and pressures employed in the process, the profile of the reinforcing layer and the nature of the thermoplastics layer, may be chosen accordingly. If the reinforcing material is readily air-permeable, the production of internally void-free products may be simplified. If the reinforcing material is a structure having, for example, concave embossings the production of a void-containing product may be simplified but it may also be possible to produce an internally void-free product. Alternatively, the thermoplastics layers may themselves comprise potentially cellular materials, for example, materials containing a blowing agent which may provide desired voids.

The process and apparatus of this invention will now be described in greater detail by way of example only with reference to the drawings in which:

FIG. 2 shows the various component dies comprising a preferred form of composite die employed in the apparatus shown in FIG. 1;

FIG. 3 shows the two major components of one of the end component dies employed in the composite die shown in FIG. 2;

FIG. 4 shows one form of treatment unit employed in the apparatus shown in FIG. 1;

FIG. 5 shows an alternative form of apparatus for use in the process; and

FIG. 6 shows a modified form of the apparatus shown in FIG. 5.

Figure 1:
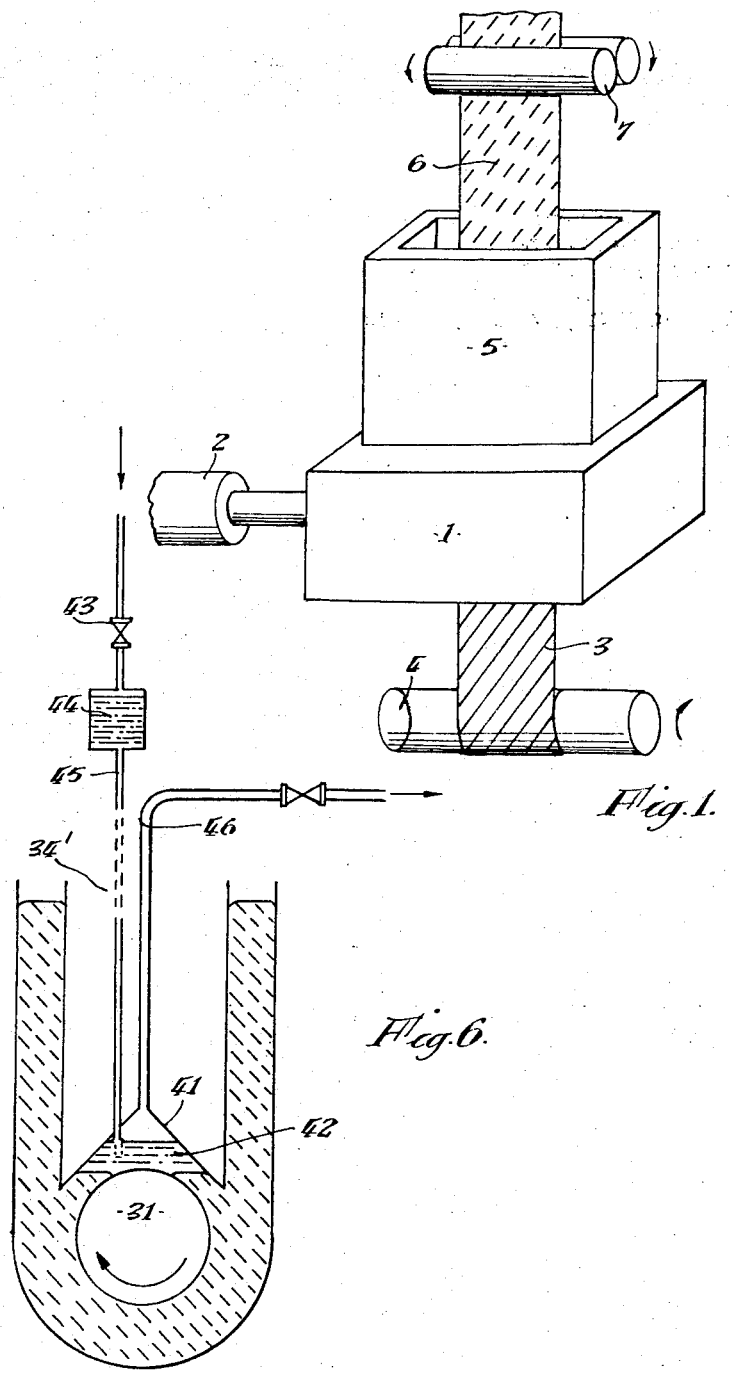
FIG. 1 shows semi-schematically, one form of apparatus according to the invention.

Referring to FIG. 1, a composite extrusion die 1 is fed by an extruder 2. The extrusion die 1 is designed such that a woven glass fibre substrate 3 supplied by let-off roll 4 can be passed through it and so that a flattened tubular thermoplastic web may be extruded there-around. The assembly comprising the flattened tubular thermoplastic web containing the woven glass fibre substrate is then passed through the treatment unit 5 where the assembly is treated to form a composite plastics structure 6. The woven glass fibre substrate is drawn through the apparatus by nipped rollers 7 acting on the surfaces of the composite plastics structure 6. Nipped rollers 7 may be water-cooled.

Referring to FIG. 2, a composite die designated 1 in FIG. 1 comprises adjustable sheet dies 8 and end component dies signified generally as 15 and mounted in die blocks 9. The composite die, which can be bolted together via holds 16, is connectable to the nozzle of an extruder at 10 and channels 11, 12, 13 and 14 are arranged to convey thermoplastic supplied by the extruder to dies 8 and 15. Dies 8 and die blocks 9 contain ducts, not shown, within which are mounted heaters.

As shown in FIG. 3 an end component die 15 comprises die sections 17 and 18 which can be bolted together and to the die block 9 shown in FIG. 2 via holes 16. Feed channel 14 is shown to be fitted with a screw throttle device 19 for controlling the flow of thermoplastic to the die lands.

In an alternative construction of the composite die shown in FIGS. 2 and 3 the channels 13 and 14 and throttle 19 are omitted so that in operation, the feed to the end component dies 15 is direct to the die orifices via dies 8.

FIG. 4 shows a treatment unit designated 5 in FIG. 1 which comprises an inner container 20 mounted inside an outer container 21 such that a cavity 22 is formed between the two containers on all four sides, the cavity 22 being sealed from the inside of the inner container 20 but being connectable thereto via valve 23. An electrical heater 24 (only a part of which is shown) is mounted in cavity 22 and serves to heat liquid in cavity 22. The base 25 of the composite container comprising inner container 20 and outer container 21 has an extrusion slot 26. A conduit 27, which is controlled by valve 28, is provided to facilitate drainage of the inner container. Base-plate 25 is adapted to be mounted in insulating engagement for example, via an asbestos gasket with an extrusion die so that a flattened tubular thermoplastic web extruded from the die may be passed through the slot 26 in peripheral sealing engagement therewith.

When employing the treatment unit shown in FIG. 4 the interconnecting valve 23 is closed and the cavity 22 is filled with treatment liquid the temperature of which is controlled by the heaters 24. As described with reference to FIG. 1, with the treatment unit suitably mounted in insulating engagement with the extrusion die 1 a flattened tubular thermoplastic web is extruded upwards through the slot 26. The end of the web is then taken up through the container 20 to engage driven nipped rollers to draw the extruded web constantly through the container 20 at controlled rate. The treatment liquid is allowed to enter container 20 by opening valve 23 to connect the cavity 22 to container 20. The depth and temperature of the treatment liquid in container 20 are then adjusted until effective treatment of the flattened tubular thermoplastics web is established. On terminating the process, the container 20 and cavity 22 can be drained as desired by means of valves 23 and 28. Preferably, drainage at least of container 20 is effected before allowing the seal between the web and the slot 26 to become broken, thus reducing the risk of spillage and loss of treatment liquid.

FIG. 5 shows an alternative form of treatment unit indicated generally by 29 comprising a vessel 30 in which at a suitable depth is mounted a driven rotatable metal roller 31 around at least part of the circumference of which a web may pass. The roller 31 may be adapted to be heated and/or cooled as desired. Vessel 30 which is heated by a heating coil 32 contains a body of treatment liquid 33 and a displacement insert 34, the purpose of which is to displace a large volume of treatment liquid which would otherwise be idle. Sheet dies 35 forming a composite die for example of the type shown in FIGS. 2 and 3 cooperate to extrude a flattened tubular thermoplastics web 36 around a continuous substrate 37 supplied from let-off roll 38 and passed through the composite die. The flattened tubular thermoplastics web 36 containing the continuous substrate 37 passes into treatment liquid 33 and engages driven roller 31 which carries the web round to a point where it is drawn off the roller and then out of the treatment liquid by nipped rollers 39 engaging the treated web 40. The depth and temperature of the treatment liquid 33 is such that the liquid treatment that the tubular web 36 containing substrate 37 receives during its passage through the treatment unit 29 is sufficient to bond the web 36 to the substrate 37 to form a composite plastics structure 40. It will be appreciated that the buoyancy forces acting on the vertical limbs of the web are substantially greater than those acting on the web illustrated in FIG. 1.

If desired a release coating may be applied to the roller 31, and this can be achieved by trapping a quantity of a liquid release agent in the arcuate space between the roller 31 and the displacement insert 34.

FIG. 6 shows an alternative method of applying a liquid release agent to the roller 31. In this arrangement, the roller 31 is located under a hood 41 which forms the lower portion of the displacement insert 34'. A release agent 42 is forced under the hood by means of an externally applied pressure (pressurizing means not shown). The pressure is adjusted by a regulating means 43 such that sufficient treatment liquid is displaced to expose a portion of upper surface of the roller 31 to the release agent contained under the hood 41. When the apparatus is in use a thin film of release agent is retained upon the surface of roller 31 when it is submerged in the treatment liquid. The release agent may be any material which causes release of the structure being treated and does not react unfavorably with the material of the structure or with the treatment liquid in the treatment unit. Usually such release agents are liquids or low melting point solids.

The release agent is conveniently supplied from a pressurized header tank 44. When the release agent is a low melting point solid the header tank 44 and feed pipe 45 may be heated to a temperature above the melting point of the release agent.

A vent pipe 46 is fitted with a pressure regulating means the purpose of which is to maintain a constant pressure in the space under the hood 41. Without the vent pipe any decomposition products produced by the release agent could cause pressure to build up under the hood.

When the treatment liquid is a hot metal alloy the preferred release agents are glycerol and glycerol tripalmitate.

The following examples illustrate the invention.

EXAMPLE 1

Apparatus of the type shown in FIG. 1 and employing a composite die and treatment unit as shown in FIGS. 2, 3 and 4 of the drawings and constructed of steel, was set up. The dimensions of the die were as follows:

Length of "sheet" die slots 6.0 inches.
Opening of "sheet" die slots 0.050 inch.
Separation of "sheet" die slots 0.125 inch.
Opening of end die orifices 0.050 inch.

The slot in the bottom of the treatment unit had the following dimensions: length, 6.25 inches; width, 0.25 inch; depth, 0.5 inch.

The dimensions of the inner container of the treatment unit were: length, 7.0 inches; width, 2.0 inches; height, 8.0 inches.

The reinforcing material was a continuous strand glass mat of maximum thickness of 0.035 inch, width 6.0 inches and weighing 1.25 oz./ft.$^2$.

The cavity 22 in the treatment unit was filled with a metal alloy comprising tin, lead and cadmium melting at 145° C. and its temperature controlled to be approximately 265° C.

Polypropylene granules (Grade PXC 3391, as manufactured and sold by I.C.I. Ltd.) were fed to the extruder and a flat tubular thermoplastic web was extruded around the glass mat in an upwards direction, the temperature of the melt being 230° C. The web and glass mat were then drawn through the die and treatment unit, using a cardboard leader, by rotating the water-cooled nipped rollers 7. When the end of the web was above the top of the treatment unit the valve connecting the cavity 22 containing the molten metal and the inner container 20 was opened to allow molten metal to enter the inner container to a depth of 7 inches. The average temperature of the molten metal was then maintained in the inner container 20 at 265° C. by thermostatically controlling the electrical heater 24 in the cavity 22. The rate of feed of the glass fibre mat through the apparatus was adjusted to 1 ft./min. and the rate of extrusion adjusted to be 6 lbs./hr. Under these conditions the glass mat was impregnated by the polypropylene. Density determinations showed that the degree of impregnation was 97% of that theoretically achievable.

EXAMPLE 2

A polypropylene impregnated glass mat was prepared as in Example 1 except that when the molten metal was introduced into the inner container of the treatment unit a layer of glycerol 1 inch deep was floated on the surface. While the product from the process of Example 1 showed occasional signs of metal entrapment the product from the modified procedure of Example 2 showed no signs of entrapment.

EXAMPLE 3

Apparatus substantially as shown in FIG. 5 of the accompanying drawings and constructed of steel was assembled. With the treatment unit 29 empty, a glass mat as employed in Example 1 was taken from a let-off roll, through the die and around the driven roller 31 in the bottom of the treatment unit 29. The end of the mat was then passed upwards through the rotating water-cooled nipped rollers 39.

The dimensions of the composite die were as follows:
Length of sheet dies 6.0 inches.
Opening of sheet dies 0.050 inch.
Separation of sheet dies 0.125 inch.
The diameter of the roller 31 was 4 inches.

A flat tubular polypropylene web was formed around the glass mat by extruding polypropylene (as used in Example 1) through the composite die at a rate of 6 lb./hr. onto the substrate moving at 1 ft./min., the temperature of the melt being 230° C. The assembly thus formed was then passed through the treatment unit 29 and when the end of the flat tubular web was clear of the top of the treatment unit 29 the latter was filled with a molten metal alloy comprising tin, lead and cadmium melting at 145° C. The temperature of the molten metal was then adjusted, by controlling the heating coils 32, to be 265° C. at the top of each of the limbs and 150° C. at the bottom, the lower temperature facilitating release of the polypropylene from the immersed driven roller 31, the temperature of which was maintained at approximately 150° C. by circulating oil at 150° C. through it. The depth of the metal alloy in the treatment unit 29, to the bottom of roller 31, was 24 inches and the surface of the metal was arranged to be 6 inches below the face of the extrusion die. On stabilization of conditions the product obtained was found to be comparable with that obtained in Example 1.

EXAMPLE 4

Two sheets of glass mat as described in Example 1 were taken from two let-off rolls and a layer of polypropylene as used in Example 1 was extruded and sandwiched between the two sheets of glass mat. The composite was then passed through the apparatus of FIG. 5 where it was surrounded by a flat tubular web of extruded polypropylene and passed through the treatment bath as described in Example 3. The product resembled that produced in Example 3 but was of thicker cross-section.

EXAMPLE 5

The center insert 34' shown in FIG. 6 was placed in the apparatus of FIG. 5 instead of the displacement insert 34. Glycerol under pressure was supplied to the upper surface of the driven roller 31 which caused the remainder of the roller to be covered with a thin layer of glycerol. The remainder of the apparatus and its operation were as described in Example 3 except that the temperatures of the roller 31 and the liquid metal in the treatment unit were maintained at about 260° C. It was noticed that the plastics composite released cleanly from roller 31.

EXAMPLE 6

Apparatus was set up as shown in FIG. 5 but in addition a tensioned continuous steel conveyor band was arranged such that it entered the treatment unit on the entry side, passed round driven roller 31, which had a diameter of 4 inches, passed through water-cooled, driven nipped rollers 39 having a diameter of 4 inches and, completing the closed loop, passed over an idler roller of diameter 2 inches before re-entering the treatment unit. The band was constructed of 0.008" thick mild steel sheet and arranged to have a mat finish on the exterior surface of the loop. The width of the band was 8" and the length of the loop was 72". The apparatus was filled with liquid metal of the composition described in Example 3 to a height of 4" above the top of roller 31, and its temperature maintained at 270° C.

Polypropylene (as used in Example 1) was then extruded through the composite die, at a rate of 4 lb./hr., around a continuous length of glass mat as employed in Example 1 passing through the die and such that the envelope was sealed against ingress of treatment liquid along its sides and end. The apparatus was arranged such that the assembly issuing from the composite die came into surface contact with the mat surface of the metal band at a point 6" above the surface of the molten metal. The speed of the band through the apparatus was arranged to be 8" per minute. The distance between the water cooled nipped rollers 39 which had polished surfaces, and the surface of the liquid metal was 12". The moving continuous band conveyed the assembly through the treatment unit and through the cooled polished nipped rollers 39, which were maintained at a temperature of 25° C. During passage of the composite structure through the treatment unit in contact with the continuous band the mat surface on the latter was imparted to the surface of the composite structure. The other surface of the composite structure was smoothed subsequently by its contact with the polished surface of the nipped rollers 39. The combined radiation cooling prior to the nipped rollers 39 and the cooling effected by passage therethrough was sufficient to permit release of the composite structure from the band, on applying a haul off pull to the composite structure beyond the nipped rollers 39. As indicated above the stripped composite structure product had one smooth surface and one mat surface.

We claim:

1. A process for the continuous manufacture of a composite plastics structure which comprises progressively passing an unbonded laminar structure comprising a reinforcing layer and at least one layer of thermoplastic material arranged so that liquid cannot contact the interface between the layers into a body of liquid wherein, while the thermoplastic layer is in an at least softened state, the unbonded laminar structure is subjected by the liquid to a pressure that causes the layers to be urged towards one another so as to bond the layers together to form a composite plastics structure and progressively withdrawing said composite plastics structure from the body of liquid.

2. A process as claimed in claim 1, wherein the edges of the unbonded laminar structure are clipped or sealed together at points along the length of the laminar structure.

3. A process as claimed in claim 1, wherein there is provided a continuous clamp or seal along the edges of the unbonded laminar structure.

4. A process as claimed in claim 1, wherein the thermoplastic layer is of a material selected from polyethylene, polypropylene, plasticized polyvinyl chloride, unplasticized polyvinyl chloride, polymethyl methacrylate, nylon, polyethylene terephthalate and a styrene-acrylonitrile copolymer.

5. A process as claimed in claim 1 wherein the pressure to which the unbonded laminar structure is subjected by the liquid consists of the hydrostatic pressure of the liquid and the pressure of a gas acting on the liquid surface.

6. A process as claimed in claim 1, wherein the reinforcing material is in the form of a web.

7. A process as claimed in claim 6, wherein the reinforcing material is selected from the group consisting of a thermoset resin, a thermoplastic resin, a metal, glass and a mineral.

8. A process as claimed in claim 1, wherein the treatment liquid is a liquid metal selected from mercury, tin alloys, lead alloys, and tin-lead alloys.

9. A process as claimed in claim 8, wherein the metal alloy contains at least one metal selected from bismuth, cadmium, copper, silver, thallium, zinc, indium, antimony and gallium.

10. A process as claimed in claim 1, wherein the unbonded laminar structure comprises a reinforcing layer having a thermoplastic layer on each side thereof.

11. A process as claimed in claim 10, wherein the unbonded structure comprises a flattened tubular thermoplastic web inside which is the reinforcing layer.

12. A process as claimed in claim 11, wherein the flattened tubular thermoplastic web is extruded from an extrusion die having means for introducing the reinforcing material continuously into the flattened tubular web directly into the treatment unit.

13. A process as claimed in claim 1, wherein the unbonded structure enters the liquid from the top of the treatment unit, passes round a roller immersed in the liquid and is withdrawn again from the top of the unit.

14. A process as claimed in claim 13, wherein the roller is a driven roller.

15. A process as claimed in claim 13, wherein a release coating is applied to the roller by running the roller through a reservoir of release agent.

16. A process as claimed in claim 13, wherein the structure passes through the liquid bath on a continuous conveyor band which passes round the roller.

17. A process for the continuous manufacture of a composite plastics structure which comprises progressively passing an unbonded laminar structure comprising at least two reinforcing layers and at least one layer of thermoplastic material arranged so that liquid cannot contact the interfaces between the layers into a body of liquid wherein, while the thermoplastic layer is in an at least softened state, the unbonded laminar structure is subjected by the liquid to a pressure that causes the layers to be urged towards one another so as to form a composite plastics structure and progressively withdrawing said composite plastics structure from the body of liquid.

18. A process as claimed in claim 17, wherein the thermoplastic layer is of a material selected from polyethylene, polypropylene, plasticized polyvinyl chloride, unplasticized polyvinyl chloride, polymethyl methacrylate, nylon, polyethylene terephthalate and a styrene-acrylonitrile copolymer.

19. A process as claimed in claim 17, wherein the treatment liquid is a liquid metal selected from mercury, tin alloys, lead alloys, and tin-lead-alloys.

20. A process as claimed in claim 17 wherein the pressure to which the unbonded laminar structure is subjected by the liquid consists of the hydrostatic pressure of the liquid and the pressure of a gas acting on the liquid surface.

21. A process as claimed in claim 17, wherein a further layer of thermoplastic material is interposed between adjacent layers of reinforcing material.

22. A process as claimed in claim 17, wherein a barrier layer is interposed between adjacent layers of reinforcing material.

23. A process as claimed in claim 17, wherein two layers of reinforcing material are incorporated by using a folded single layer of reinforcing material.

24. A process as claimed in claim 17, wherein the reinforcing material is in the form of a web.

25. A process as claimed in claim 24, wherein the reinforcing material is selected from the group consisting of a thermoset resin, a thermoplastic resin, a metal, glass and a mineral.

26. A process for the continuous manufacture of a composite plastics structure which comprises the steps of progressively passing an unbonded laminar structure comprising a flattened tubular thermoplastic layer encircling at least two reinforcing layers so that liquid cannot contact the interfaces between the layers into a body of liquid wherein, while the thermoplastic layer is in at least a softened state, the unbonded laminar structure is subjected by the liquid to a pressure that causes the layers to be urged toward one another so as to form a composite plastics structure and progressively withdrawing said composite plastics structure from the body of liquid.

27. A process as claimed in claim 26, wherein a further layer of thermoplastic material is interposed between adjacent layers of reinforcing material.

28. A process as claimed in claim 26, wherein a barrier layer is interposed between adjacent layers of reinforcing material.

29. A process as claimed in claim 26, wherein two layers of reinforcing material are incorporated by using a folded single layer of reinforcing material.

30. A process as claimed in claim 26, wherein the thermoplastic layer is of a material selected from polyethylene, polypropylene, plasticized polyvinyl chloride, unplasticized polyvinyl chloride, polymethyl methacrylate, nylon, polyethylene terephthalate and a styrene-acrylonitrile copolymer.

31. A process as claimed in claim 26, wherein the treatment liquid is a liquid metal selected from mercury, tin alloys, lead alloys, and tin-lead-alloys.

32. A process as claimed in claim 26 wherein the pressure to which the unbonded laminar structure is subjected by the liquid consists of the hydrostatic pressure of the liquid and the pressure of a gas acting on the liquid surface.

33. A process as claimed in claim 26, wherein the reinforcing material is in the form of a web.

34. A process as claimed in claim 33, wherein the reinforcing material is selected from the group consisting of a thermoset resin, a thermoplastic resin, a metal, glass and a mineral.

References Cited

UNITED STATES PATENTS

| | | | |
|---|---|---|---|
| 3,607,505 | 9/1971 | Schirmer | 156—306 |
| 2,838,800 | 6/1958 | Hertz | 264—178 R |
| 1,930,601 | 10/1933 | Townsend | 266—4 A |
| 3,051,992 | 9/1962 | Bradley | 264—178 R |

DOUGLAS J. DRUMMOND, Primary Examiner

C. WESTON, Assistant Examiner

U.S. Cl. X.R.

156—176, 179, 309; 264—178 R